United States Patent
Strauss et al.

(10) Patent No.: US 9,586,581 B2
(45) Date of Patent: Mar. 7, 2017

(54) METHOD AND DISTANCE CONTROL DEVICE FOR PREVENTING COLLISIONS OF A MOTOR VEHICLE IN A DRIVING SITUATION WITH LITTLE LATERAL DISTANCE

(75) Inventors: Matthias Strauss, Pfungstadt (DE); Galin Bobev, Darmstadt (DE)

(73) Assignee: CONTINENTAL TEVES AG & CO., Frankfurt (DE)

( * ) Notice: Subject to any disclaimer, the term of this patent is extended or adjusted under 35 U.S.C. 154(b) by 386 days.

(21) Appl. No.: 13/989,305

(22) PCT Filed: Aug. 26, 2011

(86) PCT No.: PCT/EP2011/064717
§ 371 (c)(1),
(2), (4) Date: Aug. 30, 2013

(87) PCT Pub. No.: WO2012/069219
PCT Pub. Date: May 31, 2012

(65) Prior Publication Data
US 2013/0338877 A1    Dec. 19, 2013

(30) Foreign Application Priority Data

Nov. 24, 2010   (DE) .................. 10 2010 061 829

(51) Int. Cl.
*B60W 30/09* (2012.01)
*G08G 1/16* (2006.01)

(52) U.S. Cl.
CPC ............. *B60W 30/09* (2013.01); *G08G 1/161* (2013.01)

(58) Field of Classification Search
CPC ............................ B60W 30/09; G08G 1/161

USPC ..................................... 701/41–43, 300, 301
See application file for complete search history.

(56) References Cited

U.S. PATENT DOCUMENTS

| | | | |
|---|---|---|---|
| 2011/0015851 A1* | 1/2011 | Burr et al. ..................... | 701/117 |
| 2011/0022317 A1* | 1/2011 | Okita ............................ | 701/301 |
| 2011/0082623 A1* | 4/2011 | Lu et al. ........................ | 701/41 |

FOREIGN PATENT DOCUMENTS

| | | |
|---|---|---|
| CN | 1922051 A | 2/2007 |
| CN | 101073018 A | 11/2007 |
| DE | 101 48 539 A1 | 4/2001 |
| DE | 10 2005 021 845 A1 | 12/2005 |
| DE | 10 2004 054 720 A1 | 5/2006 |
| DE | 10 2005 039 167 A1 | 2/2007 |
| DE | 10 2005 052 634 A1 | 5/2007 |
| DE | 10 2007 058 538 A1 | 6/2007 |
| DE | 10 2007 015 879 A1 | 10/2008 |

(Continued)

OTHER PUBLICATIONS

PCT International Search Report—Nov. 21, 2011.
German Examination Report—Jul. 14, 2011.

*Primary Examiner* — Richard Camby
(74) *Attorney, Agent, or Firm* — Brinks Gilson & Lione

(57) ABSTRACT

The present invention relates to a method and device for reducing instances of vehicle collisions. Based on parameter data of a first vehicle and road conditions, and parameter data regarding a second vehicle, the first vehicle can undergo warnings or positional adjustments to reduce the likelihood of a collision with the second vehicle or other collision body. The vehicle adjustment can be in the form of braking or steering adjustments. The warning can be in the form of a visual, audio, or haptic signal.

24 Claims, 4 Drawing Sheets

(56) References Cited

FOREIGN PATENT DOCUMENTS

| | | |
|---|---|---|
| DE | 10 2008 005 999 A1 | 7/2009 |
| DE | 10 2008 061 304 A1 | 7/2009 |
| EP | 1 900 589 A2 | 3/2008 |

* cited by examiner

METHOD AND DISTANCE CONTROL DEVICE FOR PREVENTING COLLISIONS OF A MOTOR VEHICLE IN A DRIVING SITUATION WITH LITTLE LATERAL DISTANCE

CROSS-REFERENCE TO RELATED APPLICATIONS

This application claims priority to German Patent Application No. 102010061829.2 filed Nov. 24, 2010 and PCT Application No. PCT/EP2011/064717 filed Aug. 26, 2011.

FIELD OF THE INVENTION

The present invention relates to a method for avoiding collisions of a vehicle and to a distance control device for avoiding collisions of a vehicle.

BACKGROUND OF THE INVENTION

Braking and steering assistance devices for motor vehicles which assist the driver in critical situations or automatically carry out a steering intervention or intervention into the vehicle braking system are already known from the prior art. For example, DE 10 2008 019 781 A1 describes, for example, a method for avoiding collisions. In this context, firstly an obstacle on a roadway is detected and subsequently the information about the obstacle is passed on to vehicles located in the vicinity by means of vehicle-to-vehicle communication. Vehicles which have the information about the obstacle output a warning to the driver or automatically carry out a braking maneuver or avoidance maneuver.

DE 10 2008 048 163 A1 discloses a vehicle system for recording and avoiding collisions. For this purpose, the vehicle has ultrasonic sensors which are mounted in the front region and/or lateral region and detect obstacles as soon as they are in sensor range. If an imminent collision is detected, the system can carry out automated steering processes for the purpose of avoidance and/or braking processes for stopping before an obstacle.

All the systems known from the prior art are subject to disadvantages insofar as they strongly brake the vehicle or even bring it to a standstill by means of an intervention into the vehicle braking system, which creates a risk of tail-end collision for the traffic traveling behind, or such a marked change in direction of the vehicle is brought about by means of an intervention into the vehicle steering system that an additional intervention of the ESP system to stabilize the vehicle becomes necessary.

The object of the present invention is to avoid a collision in a driving situation of a vehicle with only little lateral distance from a collision body without in the process creating, as a result of the intervention, an additional hazardous situation for other road users.

This object is achieved according to the present invention by means of the method and the distance control device described herein.

INTRODUCTORY DESCRIPTION OF THE INVENTION

The present invention relates to a method for avoiding collisions of a vehicle in a driving situation with little lateral distance from a collision body, wherein data from short-range sensors and/or data of a vehicle communication module is used and wherein a warning signal is output and/or intervention into the vehicle braking system and/or the vehicle steering system is carried out if a speed-dependent minimum distance of the vehicle from a collision body is undershot or the pre-calculated driving trajectory of one or more vehicles suggests an imminent collision. The method according to the present invention is distinguished by the fact that the intervention into the vehicle braking system is carried out in such a way that the driving direction of the vehicle changes in a controlled fashion. As a result, an imminent collision can easily be avoided without influencing the surrounding traffic. Because the intervention into the vehicle braking system serves to change the driving direction for the purpose of avoiding a collision, only slight deceleration of the vehicle occurs. As a result, there is a reduced danger of a tail-end collision produced for vehicles traveling behind and a traffic situation which is critical in any case is not made worse by giving rise to additional hazards.

Furthermore, the change in direction as a result of the intervention into the vehicle braking system brings about a substantially moderate influence on the driving cornering radius or the production of a substantially moderate driving cornering radius. This also results in the advantage that a sudden and severe change in direction such as is caused, for example, by an automated steering movement for performing an avoidance maneuver before an obstacle can be avoided. A sudden and severe change in direction is also frequently the trigger for instability in the driving behavior of the vehicle, which requires further vehicle control interventions, for example by the ESP system. Furthermore, a sudden and severe steering movement is associated with danger to the surrounding traffic which is also forced as a result to react correspondingly to avoid an accident. Because the method according to the present invention pre-calculates the driving trajectory of the vehicle in question and of further vehicles if appropriate, the change in direction can already be carried out at an early point by means of the intervention into the vehicle braking system such that a sudden and severe change in direction does not become necessary but instead this substantially moderate influencing of the direction can also avoid a collision.

A further advantage of the method according to the present invention is that during cornering, during which the driver of the vehicle sets a specific steering angle at the steering wheel in order to drive along a corresponding cornering radius, there is no change in relationship between the angles of the steered wheels and that of the steering wheel. In particular in a cornering situation an unexpected change in the relationship between the angle of the steering wheel and the angles of the steered wheels can unnerve and confuse the driver. Because, according to one preferred measure, the outputting of a warning signal and/or an intervention into the vehicle braking system or vehicle steering system is made dependent on a speed-dependent minimum distance, the outputting of unnecessary warnings or interventions, which are experienced as disruptive by the driver, can be avoided. It is assumed that the driver of a slowly moving vehicle has more precise control and a better overview of his vehicle and of the distance zones surrounding the vehicle than the driver of a quickly moving vehicle. In particular when the vehicle is parked in a narrow parking space, situations can occur, for example, in which a safety distance which is necessary under normal circumstances is significantly undershot.

It is preferably provided that during an intervention into the vehicle braking system for changing the driving direction the left-hand or right-hand wheels are braked in pairs. Such an intervention into the vehicle braking system is particularly suitable for influencing the driving direction since it can decelerate as strongly as possible one side of the vehicle with respect to the other side of the vehicle. As a result, braking the wheels of one side of the vehicle in a paired fashion allows the greatest possible influencing of the cornering radius to be brought about. Braking the wheels on one side of the vehicle to different degrees is also possible.

In a further preferred embodiment it is provided that during an intervention into the vehicle braking system an individual wheel is braked in order to change the driving direction. An intervention into the vehicle braking system at an individual vehicle wheel provides the advantage that depending on the type of vehicle and the driving situation which is present the intervention can be adapted in a substantially optimum fashion to the respective requirements with as much flexibility as possible. Under certain circumstances, it may therefore be advantageous in terms of vehicle stability in a cornering situation to brake, for example, just a single front wheel. Even during a control process of a driver assistance system, intervention into the vehicle braking system at just a single wheel may also be appropriate. Likewise it is possible that only a single vehicle wheel is braked when there is a need for slight influencing of the cornering radius.

It is also provided that the intervention into the vehicle braking system for changing the driving direction is imposed on an ABS control process. During an ABS control process, the vehicle is generally in a state which is critical in terms of the driving stability. This state is also perceived by the driver. If the vehicle is simultaneously also in a situation with little lateral distance from a collision body, for example in a tight bend, the driver of the vehicle finds himself in a highly stressful situation which often overloads him. As a result of the imposition according to the invention of an intervention into the vehicle braking system for changing the driving direction on an ABS control process, the advantage arises that not only is the vehicle stabilized but additionally a collision with a collision body can be avoided, in particular in a bend. In addition or as an alternative, intervention into the vehicle steering system is also possible during an ABS control process.

In a further advantageous embodiment of the present invention it is provided that the intervention into the vehicle braking system for changing the driving direction is imposed on an ESP control process. An ESP system which is present in the vehicle makes it possible to keep the vehicle safely in the lane predefined by the driver in a situation which is critical for stability, by means of selective interventions at the individual wheel brakes. Furthermore, the imposition of the inventive intervention into the vehicle braking system for changing the driving direction additionally permits the lane predefined by the driver to be corrected in order to avoid a collision. In addition or as an alternative, an intervention into the vehicle steering system is also possible during an ESP control process.

In a further preferred embodiment it is provided that the intervention into the vehicle steering system, which is carried out in addition to or as an alternative to the intervention into the vehicle braking system, is limited to a predefined, maximum steering change angle. Influencing the steering angle constitutes, in addition to selective braking of vehicle wheels on an individual or paired basis, an effective method for changing the driving direction of a vehicle. However, in order to ensure that the change in direction is not abrupt and surprising and therefore unnerving for the driver, a maximum permissible steering change angle is advantageously predefined. The maximum permissible steering change angle is configured in such a way that as a rule a collision with collision bodies which are present can be avoided as soon as said bodies are sensed by the lateral short-range sensors present in the vehicle or by means of the vehicle communication module. Nevertheless, limiting the steering angle change avoids a violent control movement which acts in an unnerving fashion on the driver. However, a combined intervention into the vehicle braking system and vehicle steering system is also possible. As a result, the advantages of both types of intervention are joined with one another.

Expediently, it is also provided that the intervention into the vehicle steering system is a recommendation to change the current cornering radius to the driver by imposing an additional moment of force on the vehicle steering wheel. As a result, the driver retains sole control over the steering angle which is set and does not feel controlled himself. Furthermore, there is the advantage that the recommendation to change the steering angle also permits a steering angle change to be carried out which is greater than the limitation on the autonomous steering angle change, without as a result unnerving the driver or making him feel controlled. Since the adaptation of the steering angle is performed by the driver himself, he experiences himself as in full control of the vehicle at all times and is therefore not unnerved by an, under certain circumstances, even abrupt steering movement which he carries out himself. In addition to the recommendation to change the current cornering radius by means of the steering wheel, an autonomous intervention into the vehicle braking system for adapting the driving direction is possible. Furthermore, it is advantageous that the warning is acoustic and/or visual and/or haptic. As a result of a warning being output to the driver, he can be alerted to an imminent collision and, if appropriate, intervene himself in a corrective fashion in the control of the vehicle. As a result, an intervention into the vehicle braking system and/or vehicle steering system can be avoided and the driver always retains sole control of the vehicle. Acoustic, visual and haptic warnings respectively have characteristic advantages which can be used individually or in combination. While a visual display, for example on the dashboard, is comparatively inconspicuous and therefore does not have an obtrusive effect on the driver, an acoustic warning can, as a rule, act more obtrusively on the driver. Furthermore, visual and acoustic warning signals permit the warning intensity to be graduated, for example by means of the tone of the color, the sound level of the acoustic signal or the output intensity. Haptic warnings, on the other hand, are generally perceived most clearly by the driver, but generally do not permit various gradations as do visual or acoustic warning signals. In particular, as a result of combinations of different types of warning output with, if appropriate, respectively different intensities the driver can be warned of a respectively present dangerous situation with the best possible, flexible adaptation.

Furthermore it is preferred that the roadway width in a bend or constriction to be driven through is acquired by means of a surroundings sensor system and/or map data and/or the vehicle communication module before the bend or constriction is driven through. This first makes it at all possible to evaluate a constriction or a bend with respect to the expected risk of collision as a function of the specific roadway width and, if appropriate, to output a warning to the driver on the basis of this evaluation. Determining the roadway width by means of map data present in the vehicle provides the advantage that as a rule the roadway width can be already read out from the map material long before the constriction or bend to be driven through. As a result, a substantially sufficiently long time period is available for issuing a warning to the driver and for a subsequent reaction of the driver. In addition, the determination of the roadway width by means of map data is independent of possible sensor arrangements or of messages which are possibly received by means of the vehicle communication module. The disadvantage of determining the roadway width on the basis of the map material is, on the other hand, the fact that not all conditions, for example newly set-up road construction sites, are necessarily known, depending on the up-to-dateness of the map material. Determining the roadway width by means of the sensors present in the vehicle provides the advantage that the actual roadway width is reliably sensed. It is disadvantageous here that the roadway width cannot be determined until the vehicle is in sensor range. The available warning time is accordingly limited. If the roadway width is sensed by a message which is received by means of the vehicle communication module, there is generally not only a comparatively long period of time available for outputting a warning but it is also possible to assume that the sensed roadway width corresponds to the current roadway width. A particularly high level of reliability of the determination of the roadway width can be obtained by combined sensing by means of a plurality of the described methods, since in this way the described disadvantages of individual methods can be compensated by the advantages of other methods.

In a further preferred embodiment of the present invention it is provided that the surroundings sensor system used for determining the roadway width is a camera-assisted lane detection system. Systems of this kind are already part of the series equipment in many vehicles and therefore provide the advantage of substantially cost-neutral implementation of the method step according to the present invention for detecting a roadway width.

Furthermore it is advantageous that a warning is output to the driver of a first vehicle if a second oncoming or overtaking vehicle approaches at excessive speed a bend or constriction to be driven through by the first vehicle, at the same time as the second vehicle. As a result, the driver of the first vehicle is already warned before an actual risk of collision occurs. The warning that an increased risk of collision may occur when a bend or constriction is driven through owing to the driving behavior of a further vehicle is issued to the driver before the respective route section. This results in the advantage that the driver can adapt his own driving behavior to the increased risk in order to apply increased attentiveness when traveling through the constriction or bend to be driven through. This not only permits collisions to be avoided but also permits situations which entail a risk of collision to be avoided or at least not to be made worse.

According to one further preferred embodiment of the present invention it is provided that a warning is output only if a transverse acceleration which exceeds 0.3 g is to be expected in the bend given the current vehicle speed. As long as the transverse acceleration caused by the cornering is lower than 0.3 g, it can be assumed that the driver generally keeps the vehicle under control without problems. A warning which proves to be unnecessary in most cases can therefore be avoided. This leads, on the one hand, to less unnerving of the driver since no unnecessary warnings are output. On the other hand, this gives rise to more confidence in the system since the driver quickly recognizes that a warning is almost always followed by a situation which entails an actual risk of collision. If a risk of collision should occur despite an expected transverse acceleration of less than 0.3 g, the system can adapt the driving trajectory at any time by means of an autonomous intervention into the vehicle braking system and/or vehicle steering system. It is also possible to issue a warning later when a risk of collision is detected.

Furthermore it is advantageous that a warning is output if the roadway width undershoots a speed-dependent minimum value. As the vehicle speed increases, it becomes more difficult for the driver of the vehicle to keep the vehicle in a lane predefined by external conditions such as the roadway boundaries or roadway markings. On the other hand, if the vehicle speed is substantially adapted to the roadway width, there is only a slight risk of collision. In this case, no warning is output to the driver since it is assumed that a collision will not occur owing to the driving behavior which is suitable for the situation. Nevertheless, if a risk of collision arises, the system carries out an autonomous braking intervention and/or intervention into the vehicle steering system for changing the driving direction and avoiding a collision. Furthermore, in this case it is also possible to issue a warning when a risk of collision is detected.

Furthermore it is advantageous that the vehicle communication module transmits at least one of the following parameters, measured by the vehicle's own vehicle sensor system, to at least one vehicle communication module of at least one other vehicle:
vehicle speed,
vehicle acceleration,
steering wheel angle,
steering wheel angle speed,
yaw rate,
yaw acceleration,
transverse acceleration,
vehicle position,
wheel rotational speeds,
driving direction and
roadway width.

This results, on the one hand, in the advantage that other vehicles already receive at an early point information about the transmitting vehicle and can detect danger possibly originating from the transmitting vehicle. If, for example on a narrow and bendy road, there is another vehicle traveling at excessive speed in the opposite direction on the other lane with respect to the vehicle in question, this can be conveyed to the vehicle in question using, for example, the information of "driving direction", "vehicle position", "vehicle speed" and "roadway width". It is correspondingly possible to output a warning to the driver. On the other hand, the advantage arises that when two vehicles drive through a constriction together an intervention into the steering or the brakes of the vehicle in question can be carried out before the vehicle's own sensors detect that a collision is imminent. The intervention is carried out in this case on the basis of the information transmitted via the further vehicle. However, transmission of the roadway width on a specific route section can also be a trigger of a warning in the receiving vehicle. In this case, the information of the "vehicle position" and "roadway width" is required. Insofar as a subsequent comparison of the received position data with the route data of the vehicle in question, for example in the vehicle navigation system, reveals that the vehicle in question will drive through an unforeseen constriction at a specific time, a warning can be output.

In a further preferred embodiment of the present invention it is provided that the driving trajectory of the vehicle in question is pre-calculated by means of at least two of the following driving parameters:
- vehicle speed,
- vehicle acceleration,
- steering wheel angle,
- steering wheel angle speed,
- yaw rate,
- yaw acceleration,
- transverse acceleration,
- vehicle position,
- wheel rotational speeds and
- driving direction.

Determining the driving trajectory provides an effective possible way of detecting the danger of a collision or predicting a collision which is imminent under certain circumstances. The greater the extent to which the driving parameters specified above are available and included in the calculation, the more precise the determination of the driving trajectory and therefore also of the risk of collision can be. The driving trajectory can therefore be evaluated to determine whether a collision with a stationary obstacle (for example boundary of a construction site on the freeway or roadway boundary in a tight bend) is imminent.

Furthermore, it is preferred that the driving trajectory of a further vehicle is pre-calculated by means of the parameters measured by the surroundings sensors and/or by means of the parameters received via the communication module. This provides the advantage that the driving trajectory of another vehicle can also be determined on the basis of the parameters of said vehicle which are received by means of the vehicle communication module, and said driving trajectory can be compared with the vehicle's own driving trajectory. As a result, effective detection of a risk of collision with a non-stationary collision body is also possible. Insofar as the other vehicle does not have a suitable vehicle communication module, the driving trajectory of the other vehicle can also be determined on the basis of the information acquired by the surroundings sensors of the vehicle in question. This permits substantially autonomous determination of the risk of collision. Likewise it is possible to determine the driving trajectory of another vehicle either by means of the parameters acquired by the surroundings sensors or else by means of the parameters acquired by the vehicle communication module. As a result of the redundancy which is produced by this, the driving trajectory of the other vehicle can be particularly reliably determined. However, only partial acquisition of the parameters of the other vehicle by means of the surroundings sensors and only partial acquisition by means of the vehicle communication module are also possible. It is therefore possible to add parameters which cannot be acquired by means of the one sensing method. If individual parameters are acquired by means of both methods, they are at least present redundantly and can be compared with one another in order to increase the reliability.

In an advantageous embodiment of the present invention it is provided that dynamic cornering of a vehicle on a multi-lane road constitutes a driving situation with little lateral distance. Just as on a narrow roadway section it is possible for situations with little lateral distance from other vehicles to occur, for example, on a multi-lane road. The occurrence of short lateral distances is highly favored by a bendy route profile and additionally high vehicle speeds. In this case, the risk of collision arises mainly from other vehicles. As a result of the classification of dynamic cornering on a multi-lane road as a driving situation with little lateral distance, the advantage is thus obtained that even in these frequently occurring and often critical situations a collision can be avoided by means of the method according to the present invention.

In a further preferred embodiment it is provided that passing a road construction area constitutes a driving situation with little lateral distance. Although road construction areas generally do not have steep bends and can only be driven through at a reduced speed, there are, for example in the case of overtaking maneuvers in the road construction area, frequently driving situations in which the lateral distance from the road construction site boundary, on the one side, and from the overtaken or overtaking vehicle on the other side enters a critical range. In order to avoid lateral collisions in these situations, the method according to the present invention is also applied in road construction areas. Since only a slight change in the driving direction is carried out, for example by means of the brakes, there is also the further advantage here that the intervention to change the driving direction is adapted as far as possible in an optimum way to the narrower lanes in road construction sites.

The present invention also relates to a distance control device which comprises short-range sensors arranged in the front region and/or lateral region of the vehicle and/or a vehicle communication module for transmitting and receiving driving parameters and/or parameters measured by a vehicle sensor system to/from other vehicle communication modules, wherein the device outputs a warning signal and/or carries out intervention into the vehicle braking system and/or the vehicle steering system if a speed-dependent minimum distance of the vehicle from a collision body is undershot or the pre-calculated driving trajectory of one or more vehicles suggests an imminent collision. The distance control device is distinguished by the fact that the device carries out the intervention into the vehicle braking system in such a way that the driving direction of the vehicle changes. The distance control device according to the present invention therefore provides all the necessary devices and modules for carrying out the method according to the present invention and therefore also provides all the resulting advantages.

It is preferably provided that the short-range sensors are short-range radar sensors and/or ultrasonic sensors. As a result of the use of sensors such as a short-range radar sensor and/or ultrasonic sensor in the front region and/or lateral region of the vehicle, the advantage arises that sensors which are already present, for example of a parking assistant, can often be used here. As a result, both the additional installation outlay and the additional costs can be kept low. In addition, such sensors are generally sufficient in terms of their sensor range in order to reliably meet the requirements of the distance control device according to the present invention. As an alternative or in addition it is, however, also possible to integrate into the vehicle sensors which are specially optimized for the detection of collision bodies during driving and which have a possibly relatively large sensor range, or else to use surroundings sensors which are already present on a standard basis and have a comparatively large range, such as for example lidar sensors, radar sensors or laser sensors.

In one advantageous embodiment of the present invention it is provided that the vehicle communication module communicates with at least one other vehicle communication module on the basis of at least one of the following connections:
- WLAN connection,
- ISM connection (Industrial, Scientific, Medical Band),
- infrared connection and
- mobile radio connection.

These types of connection provide different advantages and disadvantages here depending on the type and wavelength. WLAN connections permit, for example, a high data transmission rate. However, data transmission around an obstacle is possible only to a limited extent. In contrast, ISM connections provide a relatively low data transmission rate but permit data to be exchanged around a line of sight obstacle. An ISM band also constitutes a public frequency range which provides the further advantage that no specific approval is necessary for devices which transmit or receive in this band. Infrared connections in turn provide a low data transmission rate which is additionally highly restricted when there is no line of sight connection. Finally, mobile radio connections are not adversely affected by line of sight obstacles and provide a good data transmission rate. The connection setup for these is comparatively slow. As a result of the combination and simultaneous or parallel use of a plurality of these types of connection further advantages are obtained since in this way the disadvantages of individual types of connection can be compensated.

Furthermore it is advantageous that the device additionally comprises a satellite-based position-determining module. This provides the advantage that up-to-date vehicle position data, for example in the form of GPS coordinates, is always available. In conjunction with the parameters measured by the surroundings sensor system and the driving parameters the advantage is therefore obtained that all the necessary data is present to warn other vehicles about, for example, detected constrictions in the roadway at a specific section of a roadway by means of the vehicle communication module. By transmitting data such as the vehicle's own vehicle speed, the GPS coordinates and the driving direction derived therefrom it is also possible to issue a warning in another vehicle and/or to carry out an intervention. A warning can be output, for example, when it is apparent that both vehicles will simultaneously drive through the same constriction, and there is therefore an increased risk of collision depending on the respective vehicle speeds. The GPS coordinates can, however, also be used as a basis for intervention into the vehicle steering system or the vehicle brakes, for example if the vehicles drive through the same constriction but are still located outside each other's sensor range. By means of the vehicle communication module it is therefore possible for the data necessary for a warning or an intervention to be acquired or exchanged even just before an imminent collision.

It is preferably provided that the device additionally comprises a navigation system with digital map material. It is therefore made possible for a warning to be output, independently of surroundings sensors present in the vehicle and independently of information received by means of the vehicle communication module, if the vehicle is driving toward a constriction in the roadway for which the current vehicle speed is too high. Even if there are suitable surroundings sensors present in the vehicle, their sensor range is usually limited. Another vehicle is also frequently not in sensor range or does not have the required information about the rest of the route profile of the vehicle in question. By using digital map material it is possible, if appropriate, for a warning to be reliably output to the driver at a correspondingly early point. Since a large proportion of the vehicles on the road today have navigation systems which are in turn equipped with digital map material, there is no additional outlay involved in implementing a digital map. The map material which is present in any case is supplied to an additional use, as a result of which added value is produced without entailing additional costs.

BRIEF DESCRIPTION OF THE DRAWINGS

Further preferred embodiments can be found in the dependent claims and the following description of exemplary embodiments with reference to figures, of which:

DETAILED DESCRIPTION OF THE PRESENT INVENTION

Figure 1:
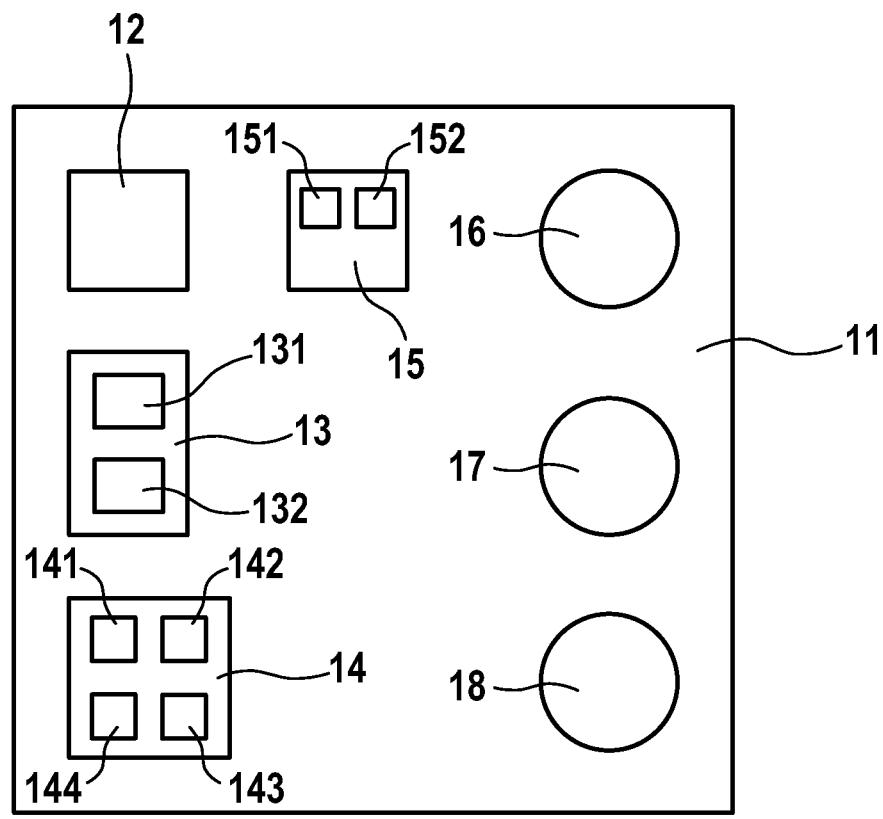
FIG. 1 is a schematic view of a possible configuration of the distance control device according to the invention.

FIG. 1 is a schematic view of an exemplary embodiment of a distance control device 11 according to the present invention. The distance control device 11 comprises a memory 12 on which digital map material is stored, short-range sensors 13, a vehicle communication module 14 and surroundings sensors 15. The short-range sensors 13 in turn comprise short-range radar sensors 131 and ultrasonic sensors 132. Both generic types of sensor are arranged both in the front region and in the lateral region of the vehicle (not illustrated) which is equipped with the distance control device. The vehicle communication module 14 has different communication means which is suitable for vehicle-to-vehicle and for vehicle-to-infrastructure communication: WLAN connecting means 141, ISM connecting means 142, infrared connecting means 143 and mobile radio connecting means 144. Furthermore, the distance control device which is illustrated by way of example comprises surroundings sensors 15 which are composed in this exemplary embodiment of a stereo camera module 151 and lidar sensor 152. A visual, acoustic and/or haptic warning can be output to the driver via the warning means 16 as soon as a risk of collision has been detected. If it is necessary to avoid a collision, a limited intervention is also carried out into the vehicle steering system using the steering intervention means 17 and/or an intervention is carried out into the vehicle braking system using the braking intervention means 18.

Figure 2:
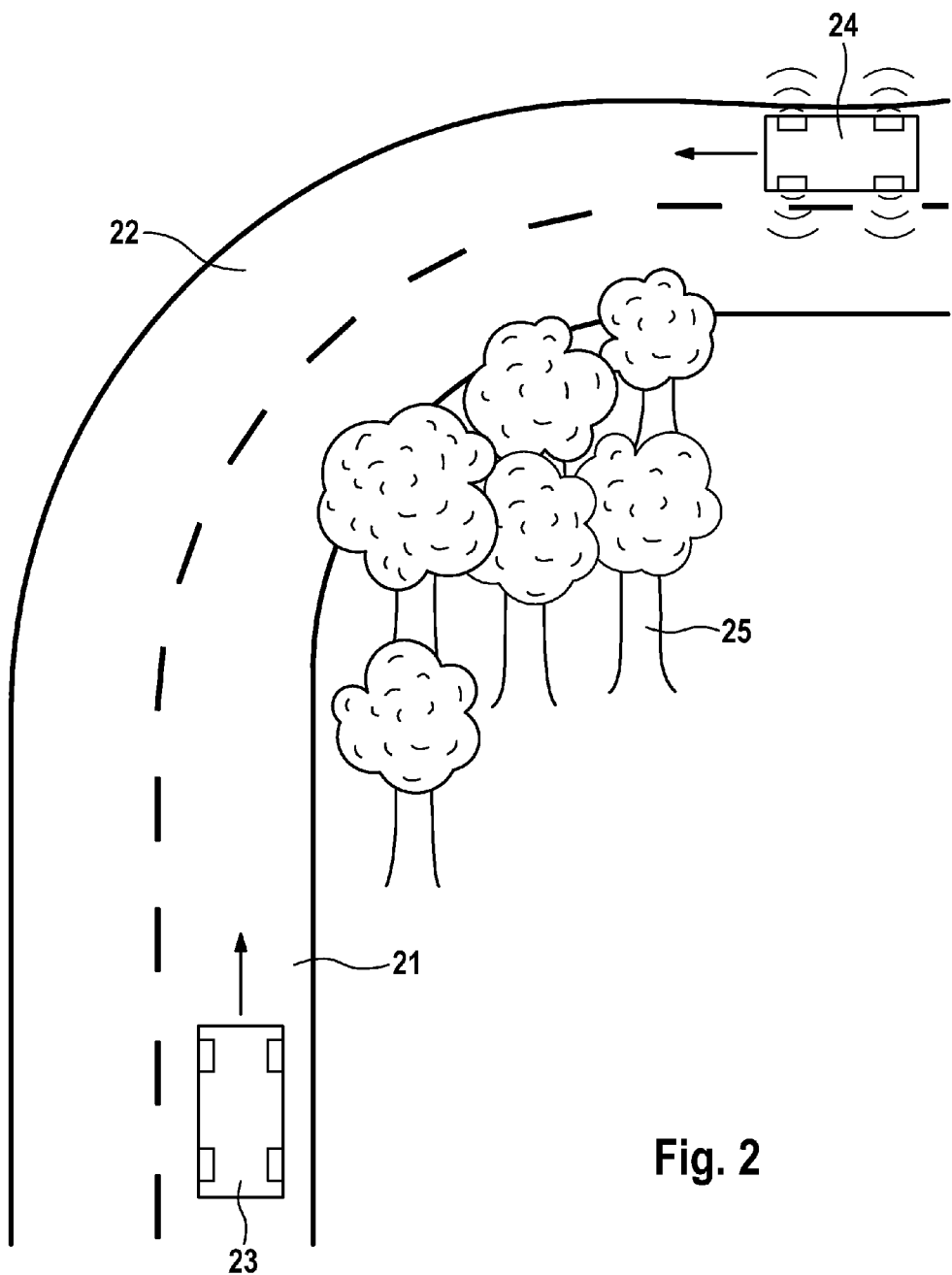
FIG. 2 shows a driving situation in a tight bend with poor visibility and oncoming traffic, the method according to the invention being used in said situation.

FIG. 2 illustrates by way of example a traffic situation in which the method according to the present invention is used. A road 21 which leads around a bend 22 is shown. Vehicles 23 and 24 are approaching the bend 22 from opposite directions. The respective driving directions of the two vehicles are illustrated by means of an arrow in the direction of movement. Because of trees 25 which are growing at the side of the road the drivers of the vehicles 23 and 24 cannot see the respective other vehicle. The vehicle 24 is equipped with the distance control device according to the present invention which, in this exemplary embodiment, uses, inter alia, ultrasonic sensors arranged laterally on the vehicle 24 as short-range sensors. Although the vehicle 23 does not have the distance control device according to the present invention, it nevertheless has a communication module which is suitable for vehicle-to-vehicle communication and via which it can set up an ISM radio link to the vehicle 24. By means of this radio link, the vehicle 23 transmits, inter alia, its GPS coordinates, its current speed, its acceleration and its driving direction. This data is received by the vehicle 24 and processed by the distance control device in the vehicle 24. By reconciling the received coordinates and by using digital map material the distance control device detects that the vehicle 23 is located on the same road as the vehicle 24. On the basis of the transmitted driving direction of vehicle 23, the distance control device also detects that the vehicle 23 is traveling towards the vehicle 24 on the opposite lane. By means of the digital map material and by taking into account the position and speed of its own vehicle, the distance control device also determines that both vehicles will drive through the bend 22 at the same time. Furthermore, the digital map data indicates that the roadway width in the bend 22 is limited. The distance control device in the vehicle 24 also detects that the current speed of the vehicle 23 is too high for the limited roadway width in the bend 22 and also that a transverse acceleration of more than 0.3 g is to be expected owing to the cornering radius. Since the acceleration data transmitted by the vehicle 23 does not permit a braking process to be detected, the distance control device outputs a warning to the driver of the vehicle 24. The driver subsequently reduces the speed of his own vehicle in order to reduce the risk of a collision and to be able to control his own vehicle better. In addition, as he drives through the bend he will pay particular attention to the vehicle 24 owing to the warning.

Figure 3:
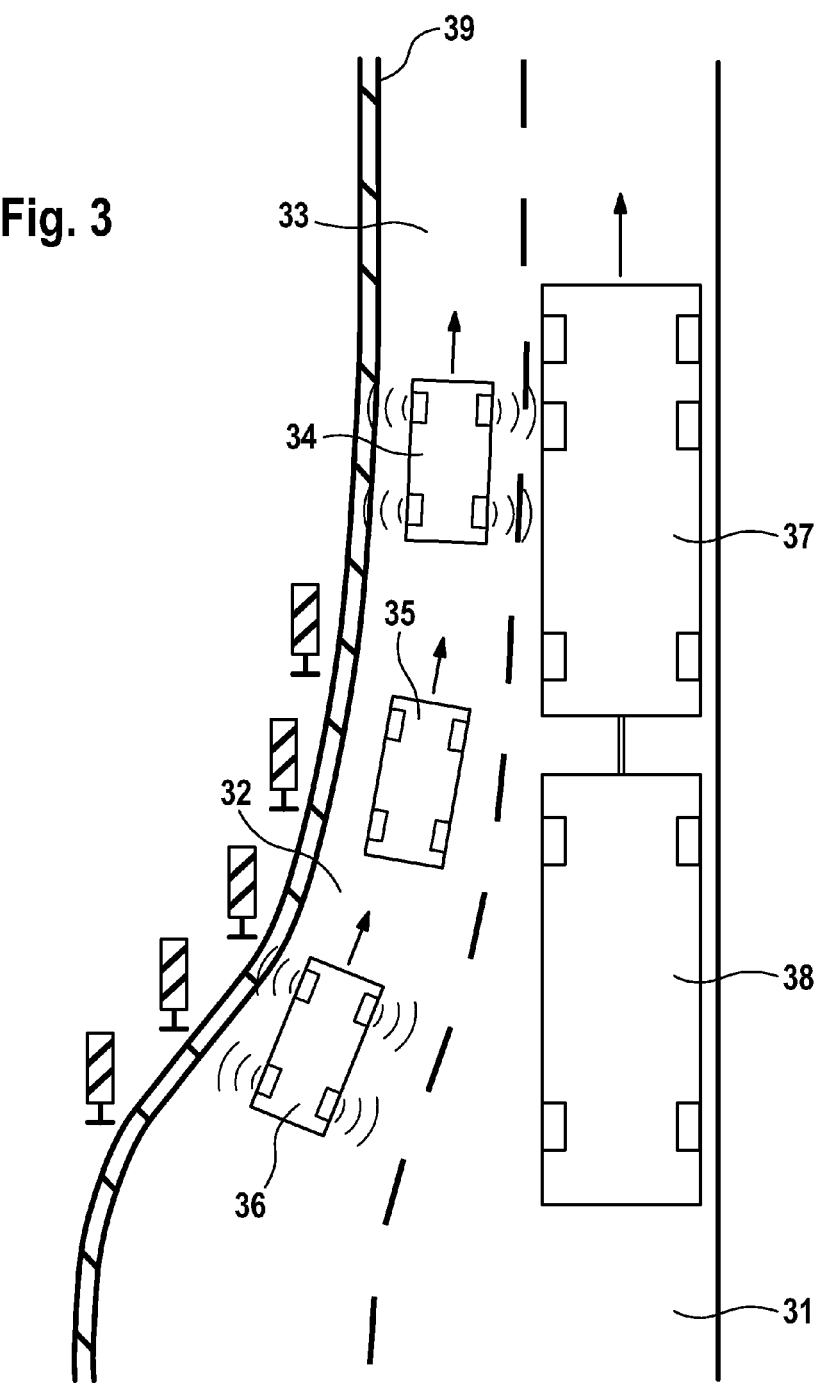
FIG. 3 shows a driving situation at a road construction site in which the method according to the invention is used.

FIG. 3 shows a road 31 which, after a narrow point 32, proceeds into a road construction area 33. The roadway is limited on the left-hand side by the roadway boundary 39. On the right-hand lane of the roadway 31 there is, in this exemplary embodiment, a truck 37 with a trailer 38. The direction of movement of all the vehicles represented is illustrated by arrows. Owing to the dimensioning and, in particular, the width of the truck 37, the roadway width of the roadway 31 in the road construction area 33 is strictly limited to the height of the truck 37. This results in a situation which entails an increased risk of a lateral collision for an overtaking passenger car 34. Since, in this exemplary embodiment, the passenger car 34 is equipped with the distance control device according to the present invention, which has short-range radar sensors arranged laterally on the vehicle, the distance control device carries out an intervention into the vehicle braking system at the vehicle wheels in order to keep constant the lateral distance both from the truck 37 and from the left-hand roadway boundary 39. Since the intervention into the vehicle braking system is only small and gives rise only to a relatively weak deceleration of the vehicle, the intervention does not result in any risk of a tail-end collision for the passenger car 35 which is traveling close behind. In addition, at all times the driver of the vehicle 34 has the sensation of having full control over his vehicle since the change in the driving direction takes place without an intervention in the vehicle steering system which can be perceived by the driver.

A vehicle 36 which is also illustrated in FIG. 3 is located at the narrow point 32 and is driving into the road construction area 33. Since the driver of the vehicle 36 has refrained from initiating a deceleration process until just before the narrow point 32 is reached, the vehicle 36 is approaching the vehicle 35 at a high speed. The driver of the vehicle 36 is therefore forced to decelerate to a maximum degree and at the same time steer the vehicle 36 through the narrow point. As a result of the strong deceleration and the simultaneous steering movement, the vehicle 36 becomes unstable and the ESP system engages in order to stabilize the vehicle 36 again. For example, the vehicle 36 also has a distance control device according to the present invention which senses the lateral distance from possible collision obstacles by means of ultrasonic sensors arranged laterally on the vehicle. Since the driver 36 cannot cope with the present situation, the vehicle 36 moves right up to the roadway boundary 39 during the ESP control process, which is registered by the distance control device. In order to avoid a lateral collision, the distance control device imposes on the ESP control process an intervention into the vehicle braking system for changing the driving direction. Since the intervention into the vehicle braking system for changing the driving direction alone does not bring about a sufficiently large change in driving direction to avoid a collision, the distance control device continues to detect a decreasing lateral distance from the roadway boundary 39. In order still to avoid the imminent collision, the distance control device carries out, in addition to the intervention into the vehicle braking system, an intervention into the vehicle steering system. The intervention into the vehicle steering system is limited here to a maximum steering change angle in order to avoid further destabilizing the vehicle 36, which is in any case in an ESP control process. As a result of the combined intervention into the vehicle steering system and vehicle braking system it is possible to avoid a lateral collision with the roadway boundary 39.

Figure 4:
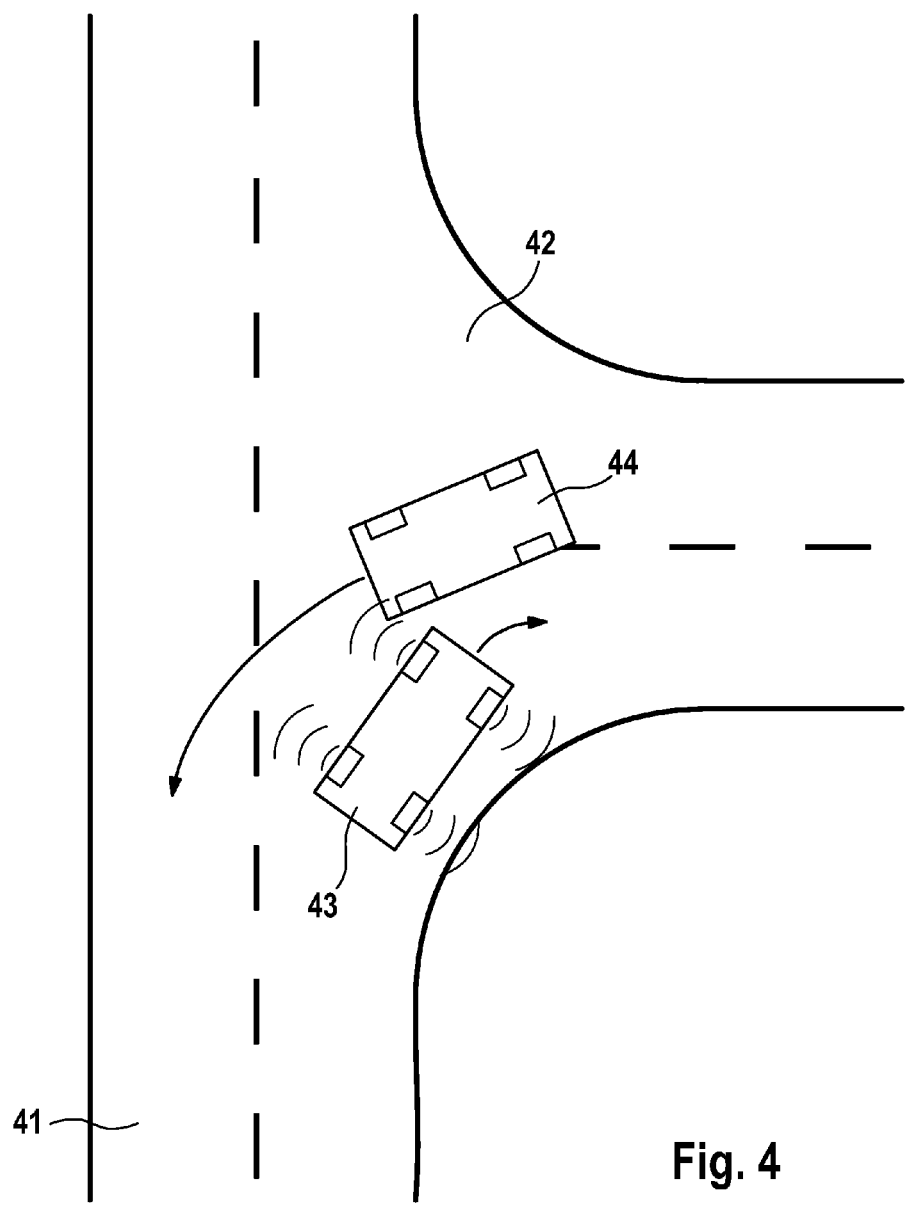
FIG. 4 shows a maneuver where two vehicles on an intersection are turning off, in which maneuver the method according to the invention is also used.

The exemplary embodiment in FIG. 4 shows a road 41 with a junction 42. A vehicle 43 and a vehicle 44 are located on the road 41. The vehicle 43 carries out a right-hand turning process at the junction 42 (illustrated by the arrow on the vehicle 43), while the vehicle 44 at the same time carries out a left-hand turning process at the junction 42. Since the vehicle 44 starts the turning process too early, it moves over to the side of the roadway of vehicle 43 during the turning process. Both vehicles have vehicle-to-vehicle communication means on the basis of WLAN. By means of the vehicle-to-vehicle communication means, the distance control device arranged in the vehicle 43 is informed of the steering wheel angle and speed of the vehicle 44. By means of the stereo camera which is also present in the vehicle 43 and which is suitable for measuring distance, the distance control device in vehicle 43 determines the relative position of the vehicle 44 with respect to the vehicle 43. The distance control device can pre-calculate the driving trajectory of the vehicle 44 from the steering wheel angle data and the speed of the vehicle 44. On the basis of the relative position of the two vehicles and of the vehicle's own speed as well as its own steering wheel angle, the distance control device detects that a lateral collision will occur unless one of the two vehicles changes its driving trajectory. For this reason, an acoustic warning is issued to the driver of the vehicle 43 in order to alert him to the present danger. At the same time, an additional moment of force is imposed on the vehicle steering wheel in order to give the driver a recommendation for correcting the driving trajectory in order to avoid a collision. However, since the driver does not react to the warning and does not follow the recommendation to change the steering wheel angle, the two vehicles continue to approach one another on their original driving trajectories. As soon as a certain lateral distance between the two vehicles is undershot, the vehicle 44 moves into the sensor range of the ultrasonic sensors of vehicle 43. Since the distance control device also evaluates the signals of the ultrasonic sensors, it can verify the pre-calculated risk of a collision in this way. In order still to avoid the imminent collision, the distance control device carries out a braking intervention at the right-hand vehicle wheels of the vehicle 43. This reduces the cornering radius being driven through by vehicle 43 and the collision can be avoided.

While the above description constitutes the preferred embodiment of the present invention, it will be appreciated that the present invention is susceptible to modification, variation and change without departing from the proper scope and fair meaning of the accompanying claims.

The invention claimed is:

1. A method for avoiding collisions of a vehicle in a driving situation with little lateral distance from a collision body, the method comprising:
   receiving data provided by a lateral short range sensor;
   providing an intervention in the driving direction of the vehicle based on the data, wherein the intervention in the driving direction comprises an intervention into at least one of a vehicle braking system and a vehicle steering system, the intervention being performed in response to determining that a speed-dependent minimum distance of the vehicle from the collision body is undershot or a pre-calculated driving trajectory of the vehicle suggests an imminent collision; and
   wherein the intervention comprises an intervention into the vehicle steering system and the intervention into the vehicle steering system is a recommendation to change the current cornering radius to the driver by superimposing an additional moment of force on the vehicle steering wheel.

2. The method as claimed in claim 1, wherein the intervention comprises an intervention into the vehicle braking system and during the intervention into the vehicle braking system for changing the driving direction the left-hand or right-hand wheels are braked in pairs.

3. The method as claimed in claim 1, wherein the intervention comprises an intervention into the vehicle braking system and during the intervention into the vehicle braking system an individual wheel is braked in order to change the driving direction.

4. The method as claimed in claim 1, wherein the intervention comprises an intervention into the vehicle braking system and the intervention into the vehicle braking system for changing the driving direction is imposed on an ABS control process.

5. The method as claimed in claim 1, wherein the intervention comprises an intervention into the vehicle braking system and the intervention into the vehicle braking system for changing the driving direction is imposed on an ESP control process.

6. The method as claimed in claim 1, wherein the intervention comprises an intervention into the vehicle steering system and the intervention into the vehicle steering system is limited to a predefined, maximum steering change angle.

7. The method as claimed in claim 1, further comprising outputting a warning signal wherein the warning is at least one of acoustic, visual, and haptic.

8. The method as claimed in claim 1, wherein a roadway width in a bend or constriction to be driven through is determined, before the bend or constriction is driven through, by means of at least one of: a surroundings sensor system; map data; and, wherein the data is provided at least by a vehicle communications module, the vehicle communication module.

9. The method as claimed in claim 8, wherein the roadway width is determined by means of at least the surroundings sensor system and the surroundings sensor system comprises a camera-assisted lane detection system.

10. The method as claimed in claim 1, wherein the vehicle comprises a first vehicle and the collision body comprises a second vehicle comprising an oncoming or overtaking vehicle, the method further comprising outputting a warning to the driver of the first vehicle in response to determining that the second vehicle is approaching a bend or constriction to be driven through by the first vehicle at about the same time as the second vehicle.

11. The method as claimed in claim 1, further comprising outputting a warning signal, wherein the warning signal is output in response to determining that a transverse acceleration which exceeds 0.3 g is to be expected in a bend given a current vehicle speed.

12. The method as claimed in claim 1, further comprising outputting a warning signal, wherein the warning signal is output in response to determining that a roadway width undershoots a speed-dependent minimum value.

13. The method as claimed in claim 1, wherein the data is provided at least by a vehicle communication module, the method further comprising transmitting from the vehicle communication module of the vehicle at least one parameter measured by a sensor system of the vehicle to at least one vehicle communication module of at least one other vehicle, wherein the at least one parameter comprises at least one of:
   vehicle speed,
   vehicle acceleration,
   steering wheel angle,
   steering wheel angle speed,
   yaw rate,
   yaw acceleration,
   transverse acceleration,
   vehicle position,
   wheel rotational speeds,
   driving direction, and
   roadway width.

14. The method as claimed in claim 1, wherein the driving trajectory of the vehicle is pre-calculated by means of at least two driving parameters wherein the at least two driving parameters comprises at least two of:
   vehicle speed,
   vehicle acceleration,
   steering wheel angle,
   steering wheel angle speed,
   yaw rate,
   yaw acceleration,
   transverse acceleration,
   vehicle position,
   wheel rotational speeds, and
   driving direction.

15. The method as claimed in claim 1, wherein the vehicle comprises a first vehicle and a driving trajectory of a second vehicle is pre-calculated by means of at least one of: parameters measured by a surroundings sensor system of the first vehicle; and, wherein the data is provided at least by a vehicle communication module, parameters received via the vehicle communication module.

16. The method as claimed in claim 1, wherein dynamic cornering of a vehicle on a multi-lane road constitutes a driving situation with little lateral distance.

17. The method as claimed in claim 1, wherein passing a road construction area constitutes a driving situation with little lateral distance.

18. A distance control device comprising:
   lateral short-range sensors arranged in a region of the vehicle;
   wherein the device carries out an intervention based on data received from the short range sensors into the driving direction of the vehicle, wherein the intervention comprises at least one of an intervention into a vehicle braking system, and an intervention into a vehicle steering system if a speed-dependent minimum distance of the vehicle from a collision body is undershot or a pre-calculated driving trajectory of the vehicle suggests an imminent collision, wherein the device carries out the intervention into the driving direction in such a way that the driving direction of the vehicle changes in a controlled fashion, and wherein the intervention comprises an intervention into the vehicle steering system and the intervention into the vehicle steering system is a recommendation to change the current cornering radius to the driver by superimposing an additional moment of force on the vehicle steering wheel.

19. The device as claimed in claim 18, wherein the short-range sensors comprise at least one of short-range radar sensors and ultrasonic sensors.

20. The device as claimed in claim 18, wherein the vehicle communication module communicates with at least one other vehicle communication module via at least one connection, the at least one connection comprising at least one of a WLAN connection, ISM connection (Industrial, Scientific, Medical Band), infrared connection, and mobile radio connection.

21. The device as claimed in claim 18, further comprising a satellite-based position-determining module.

22. The device as claimed in claim 18, further comprising a navigation system with digital map material.

23. The method as claimed in claim 1, further comprising the step of receiving data a vehicle communication module.

24. The device as claimed in claim 18, wherein the distance control device additionally comprises a vehicle communication module for transmitting and receiving driving parameters and/or parameters measured by a vehicle sensor system to/from other vehicle communication modules.

* * * * *